Dec. 15, 1959     J. A. HOUSTON     2,917,611
BATTERY CABLE SWITCH
Filed April 23, 1958
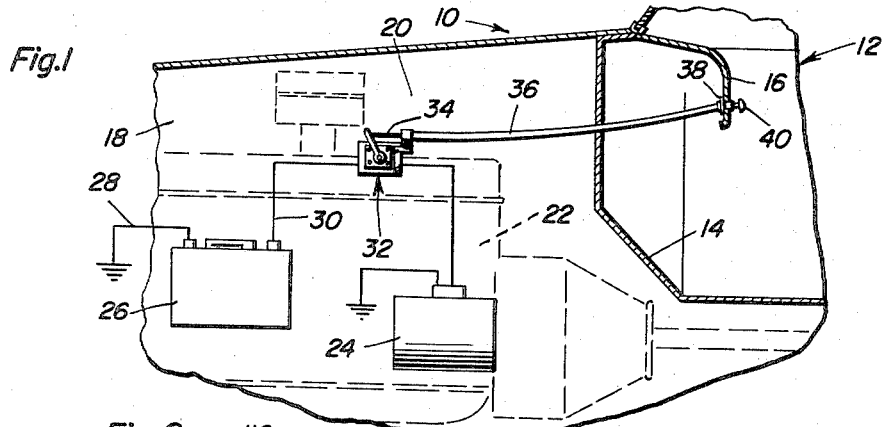
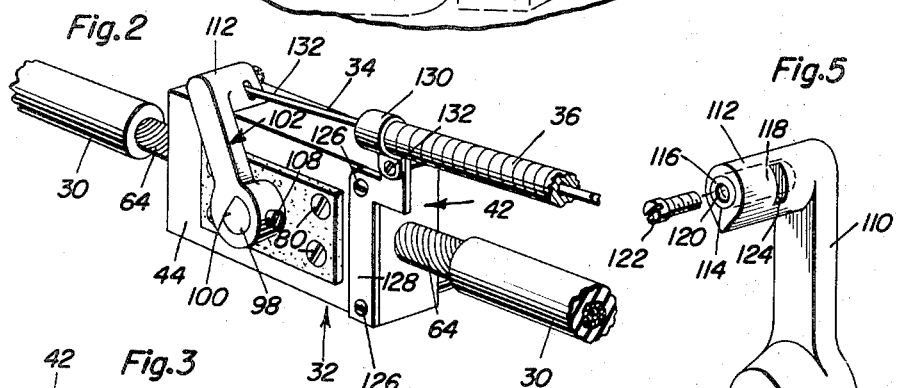
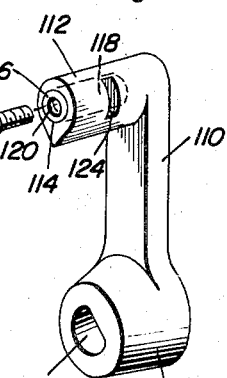
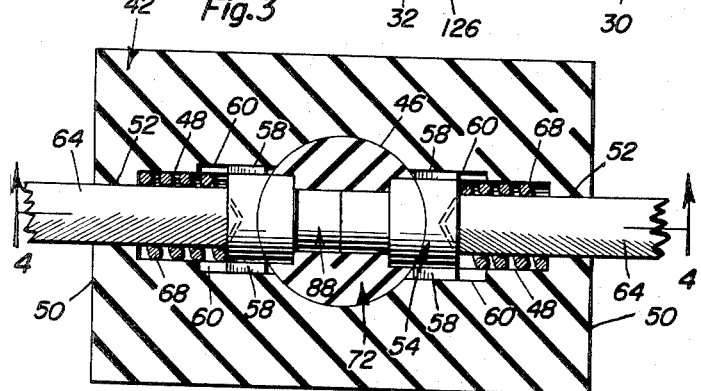
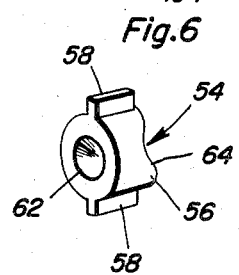
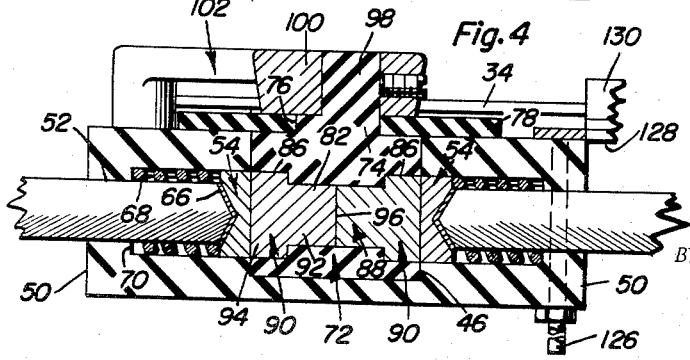
Joseph A. Houston
INVENTOR.

United States Patent Office 2,917,611
Patented Dec. 15, 1959

2,917,611

BATTERY CABLE SWITCH

Joseph A. Houston, Kingwood, W. Va.

Application April 23, 1958, Serial No. 730,296

3 Claims. (Cl. 200—161)

This invention relates in general to new and useful improvements in switches in automobiles, and more specifically to a switch which may be mounted in a battery cable.

Although the ignition switch of an automobile turns off the ignition system of an automobile and thus stops the operation of the engine thereof, there remains in the automobile numerous wires which are energized and which if become shorted will cause the battery to run down. Further, should these wires become shorted, there is a possibility that a fire would start. Further, in many instances the voltage regulator of an automobile improperly functions and shorts across to the generator with the result that the generator attempts to act as a motor and not only is the voltage generator burned out completely, but also the generator becomes burned beyond repair. These and other reasons which will become apparent with the use of this invention, it is the primary object of this invention to provide a switch that may be mounted in the battery cable of the vehicle whereby the battery may be completely disconnected from the remainder of the electrical system of a vehicle when the operator of the vehicle so desires.

Another object of this invention is to provide an improved switch which may be mounted in the battery cable of a vehicle, the switch being provided with a remote cable type operator whereby the switch may be opened or closed, as desired, by the operator of the vehicle when seated in the operator's seat.

Another object of this invention is to provide an improved switch for selectively cutting a battery out of an electrical system of an automobile, the switch being of the rotary type and being so constructed whereby the on and off positions of the switch is assured by movement of the operator for the switch to the maximum distance possible.

Another object of this invention is to provide an improved switch for mounting in a battery cable, the switch being so constructed whereby it may be readily bolted on the inner splash panel of an engine compartment of a vehicle and positioned for receiving opposed ends of a battery cable whereby a minimum space is required and at the same time the mounting of the switch is facilitated.

A further object of this invention is to provide an improved switch for opening and closing a battery cable whereby a battery may be selectively disconnected from the remainder of the electrical system of a vehicle, the switch being extremely small and compact and at the same time being so constructed whereby it is capable of handling the heavy load which will be imposed thereon during the operation of the vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a schematic view of a portion of an automobile and shows mounted in one of the battery cables thereof the battery cable switch which is the subject of this invention;

Figure 2 is an enlarged perspective view showing the battery cable switch and its relationship to a battery cable;

Figure 3 is an enlarged vertical sectional view taken through the battery cable switch and shows the specific details of the contacts and switch member thereof;

Figure 4 is an enlarged fragmentary sectional view taken substantially upon the plane indicated by the section line 4—4 of Figure 3 and shows further the details of construction of the switch;

Figure 5 is an enlarged exploded perspective view of a control arm for the switch; and Figure 6 is an enlarged perspective view of one of the contacts of the switch.

Referring now to the drawings in detail, it will be seen that there is illustrated in Figure 1 a portion of the vehicle which is referred to in general by the reference numeral 10. The vehicle 10 includes a vehicle body 12 which in part includes a firewall and floor assembly 14, an instrument panel 16 and an engine compartment 18, the engine compartment 18 being at least partially confined by a splash panel 20 forming a side thereof. Mounted within the engine compartment 20 is an engine 22 which includes a starter 24. The vehicle 10 has an electrical system which includes among other items a battery 26 which is grounded by means of a first battery cable 28 which has connected thereto a second battery cable 30. The second battery cable 30 is normally considered the hot wire of the electrical system and is suitably connected to the starter 24. It is to be understood that when the battery cable 30 is cut in half or removed from the battery 26, the battery 26 is no longer connected to any part of the electrical system of the vehicle 10.

Incorporated in the battery cable 30 is a battery cable switch which is the subject of this invention, the battery cable switch being referred to in general by the reference numeral 32. The battery cable switch 32 is operated by means of a control cable 34 which is mounted in a flexible housing 36. The forward end of the housing 36 is suitably anchored to the battery switch cable 32 in a manner to be described in more detail. The rear end of the housing 36 is anchored to the instrument panel 16 as at 38 and there is provided a pull knob 40 on the cable 34 to facilitate the operation of the switch 32 from within the vehicle 10.

Referring now to Figures 2, 3 and 4 in particular, it will be seen that the battery cable switch 32 includes an insulated housing 42 which is in the form of a large block of insulating material. The block 42 will be normally disposed in a vertical position and will be rectangular in outline. By associating the block 42, it may be formed at a relatively inexpensive cost and at the same time will have the sufficient structural strength. The block 42 and the other insulated components of this invention will be formed of the insulating material best suited for a switch of this particular type.

Extending through a vertical face 44 of the housing 42 is a recess 46. The recess 46 is intersected by a pair of longitudinal bores 48 which are aligned and which open through ends 50 of the housing 42. The bores 48 have reduced end portions 52, as is best shown in Figures 3 and 4.

Disposed in each of the bores 48 is a contact which is referred to in general by the reference numeral 54. Each contact 54 includes a circular cross sectional body portion 56 which has extending longitudinally and outwardly therefrom a pair of integral keys 58. The keys 58 are received in keyways 60 which open into the bores 48 and thus prevent rotation of the contacts 54. The outer end of each contact 54 is provided with a generally conical recess 62 for receiving a battery cable end. The opposite end of each of the contacts 54 is configurated as at 64 to conform to the shape of the recess 46.

Extending into the bores 48 are ends of the cable portion 64 of the battery cable 30, the battery cable 30 being interrupted by the battery cable switch 32. The cable portions 64 are secured to their respective contacts 54 by means of solder connections 66.

Encircling the end parts of the cable portions 64 are coil springs 68. The coil springs 68 bear against shoulders 70 formed by the reduced portion 52 of the bore 48 and have the opposite ends thereof bearing against their respective contacts 54. Thus, the contacts 54 are urged inwardly into the recess 46.

Seated in the recess 46 is a switch member which is referred to in general by the reference numeral 72. The switch member 72 is circular in cross section, as is best shown in Figure 3, and conforms to the shape of the bore 46, the walls of the bore 46 forming a bearing for the switch member 72. The switch member 72, and housing 42 is formed of a suitable insulated material. The switch member 72 includes a reduced outer portion 74, which is best shown in Figure 4, which is rotatably journalled in a bore 76 formed in a cover plate 78. The cover plate 78 is secured in place on the housing 42 by means of suitable fasteners 80. The cover plate 78 is also formed of a suitable insulating material and serves to retain the switch member 72 within the housing 42.

Extending transversely through the switch member 72 is a bore 82 which has enlarged outer portions 86. The outer portions 86 of the bore 82 are of the same cross section as are the bores 48. Extending through the bore 82 is a contact bridging member which is referred to in general by the reference numeral 88. The contact bridging member 88 is formed in two parts 90 which are identical. The individual parts 90 include a reduced inner portion 92 and an enlarged outer portion 94, the portions 92 and 94 corresponding in cross section to the bore 82 and its enlarged portion 86. The opposed ends of the parts 90 are secured together as at 96.

The contact bridging member 88 and the contacts 54 will be formed of a suitable electrically conductive material, such as brass or the like. It is to be understood that the contact surfaces between the contacts 54 and the contact bridging member 88 will be sufficient to take care of any load which may be placed upon the switch 32.

By forming the contact bridging member 88 to two parts 90, the contact bridging member 88 may be permanently mounted within the switch member 72 against movement. The opposed ends of the parts 90 are provided with a thin layer of solder which forms the joints 96 and then the parts 90 are heated. At the time the joint is made, the parts 90 will be elongated because of their raised temperature. When the parts 90 cool down to their normal temperatures, there will, of course, be a shrinkage which will tightly hold the contact bridging member 80 in its proper position in the switch member 72.

The switch member 72 also includes a further extension 98 which is disposed outwardly of the cover plate 78. The extension 98 includes a flat side 100, but is otherwise circular in cross section. Secured to the extension 98 is a control arm 102 which is best illustrated in Figure 5.

The control arm 102 includes a hub 104 having an opening 106 therethrough which corresponds to the cross section of the portion 98. The hub 104 is also provided with a setscrew 108 which secures the control arm 102 on the extension 98.

Extending from the hub 104 is a flat arm 110 which is offset from the center of the hub 104. Extending from the opposite end of the arm 110 in a direction opposite from the hub 104 is a connection portion 112. The connecting portion 112 has a longitudinal bore 114 in which there is positioned a cable connector 116. The cable connector 116 has a small diameter transverse bore 118 and an internally threaded longitudinal bore 120. The clamping screw 122 is threadedly engaged in the bore 120 and is intended to extend transversely of the bore 118.

In order that a cable, such as the cable 34 may be connected to the control arm 102, the portion 112 is provided with a slot 124 which aligns with the bore 118. The slot 124 permits relative rotation of the fitting 116 within the portion 112 to compensate for the movement of the control arm 102.

Secured to the face 44 of the housing 42 by means of elongated bolts 126 is a Z-shaped mounting bracket 128. The Z-shaped mounting bracket 128 terminates in the upper part thereof and the clamp 130 which includes a clamp bolt 132. The clamp 130 is used to anchor the forward end of the housing 76.

The bolts 126 are a length in excess of the thickness of the housing 42. Thus the same bolts 126 may be used for the purpose of mounting the switch 32 on the panel 18.

The control arm 102 is so configured whereby the portion 112 will engage the upper wall 136 of the housing 42 so as to limit the pivoting of the switch member 72. When the control arm 102 is pivoted to its forwardmost position, as is shown in Figure 2, then the contact bridging member 88 is aligned with the contacts 54 and the circuit through the battery cable 30 is completed. On the other hand, when the cable 34 is moved rearwardly so as to pivot the control arm 102 to its rearwardmost position, the portion 112 again engages the upper wall 132 so as to stop the contact bridging member 88 in a position completely out of alignment with the contacts 54. Thus, it is assured that there is no bridging of the contacts 54 and the battery 26 is completely disconnected from the main electrical system of the vehicle by opening the cable 30.

From the foregoing description of the switch 32, it will be seen that the switch 32 is of an extremely simple construction and at the same time, while it is compact, is so constructed whereby it is of a capacity to take any loads which the electrical system of the vehicle 10 is intended. Inasmuch as the contacts 54 and the bridging contact member 88 are of a larger diameter than the cable portion 64 of the battery cable 30, the cable portion 64 will burn in half before the contacts 54 or the contact bridging member 88 will burn in half.

Although the switch 32 has been illustrated as being mounted on the right hand panel of the engine compartment, it will be understood that the switch may be turned over and used on the left hand panel of the engine compartment. Depending upon the particular model of vehicle, the battery will be on the left or right hand side of the engine compartment. It is, of course, desirable that the switch 32 be mounted adjacent the battery in order to hold the length of the battery cable to a minimum.

The safety features of the present invention are numerous and many more than those set forth hereinbefore will become apparent upon study of the invention and through the use thereof. The switch 32 may also be used as a safety device against theft. By providing a suitable lock on the control lever, the control lever may be locked in an "open" position. Such a padlock could be passed through a suitable hole in the control cable bracket.

The foregoing is considered as illustrative only of the principles of the invention. Further, since numerous modifications and changes will readily occur to those skilled in the art it is not desired to limit the invention to the exact construction and operation shown and described, and accordingly all suitable modifications and equivalents may be resorted to, falling within the scope of the invention as claimed.

What is claimed as new is as follows:

1. In combination with a vehicle of the type including a battery cable extending between a battery and a starter, and a remote instrument panel, a battery cable switch assembly, said battery cable switch assembly comprising an insulated housing, a transverse cylindrical recess in said housing, aligned longitudinal bores in said housing, said bores opening through opposite ends of said housing and into said recess, keyways in said bores, opposed contacts in said bores immediately adjacent said recess, keys on said contacts received in said keyways, a rotary switch member seated in said cylindrical recess, said switch member including a diametrically positioned contact bridging member, each of said contacts having a battery cable seat remote from said rotary switch member receiving a battery cable, a shoulder in each bore, a spring member concentrically disposed about said battery cable in each bore, said opposed contacts having a larger diameter than said battery cable, said spring members positioned between said shoulders and said contacts for urging said contacts into electrical connection with said bridging member.

2. In combination with a vehicle of the type including a battery cable extending between a battery and a starter, and a remote instrument panel, a battery cable switch assembly, said battery cable switch assembly comprising an insulated housing, a transverse cylindrical recess in said housing, aligned longitudinal bores in said housing, said bores opening through opposite ends of said housing and into said recess, keyways in said bores, opposed contacts in said bores immediately adjacent said recess, keys on said contacts received in said keyways, a rotary switch member seated in said cylindrical recess, said switch member including a diametrically positioned contact bridging member, each of said contacts having a battery cable seat remote from said rotary switch member receiving a battery cable, a shoulder in each bore, a spring member concentrically disposed about said battery cable in each bore, said opposed contacts having a larger diameter than said battery cable, said spring members positioned between said shoulders and said contacts for urging said contacts into electrical connection with said bridging member, a control arm connected to said rotary switch member exteriorly of said housing, said control arm having an offset end engageable with said housing for limiting rotation of said rotary switch member between a contact bridging position and an open position.

3. In combination with a vehicle of the type including a battery cable extending between a battery and a starter, and a remote instrument panel, a battery cable switch assembly, said battery cable switch assembly comprising an insulated housing, a transverse cylindrical recess in said housing, aligned longitudinal bores in said housing, said bores opening through opposite ends of said housing and into said recess, keyways in said bores, opposed contacts in said bores immediately adjacent said recess, keys on said contacts received in said keyways, a rotary switch member seated in said cylindrical recess, said switch member including a diametrically positioned contact bridging member, each of said contacts having a battery cable seat remote from said rotary switch member receiving a battery cable, a shoulder in each bore, a spring member concentrically disposed about said battery cable in each bore, said opposed contacts having a larger diameter than said battery cable, said spring members positioned between said shoulders and said contacts for urging said contacts into electrical connection with said bridging member, a control arm connected to said rotary switch member exteriorly of said housing, said control arm having an offset end engageable with said housing for limiting rotation of said rotary switch member between a contact bridging position and an open position, a control cable mounted in a flexible housing, said cable connected between said control arm and a pull knob, said pull knob mounted on said instrument panel.

References Cited in the file of this patent

UNITED STATES PATENTS

| | | |
|---|---|---|
| 1,784,697 | Martin et al. | Dec. 9, 1930 |
| 2,144,414 | Milliken | Jan. 17, 1939 |
| 2,543,119 | Mason | Feb. 27, 1951 |
| 2,684,419 | Gerlach | July 20, 1954 |
| 2,803,725 | Ott | Aug. 20, 1957 |